No. 648,795. Patented May 1, 1900.
J. R. RICHARDSON.
ROLLER BEARING FOR AXLES.
(Application filed Jan. 20, 1900.)
(No Model.)
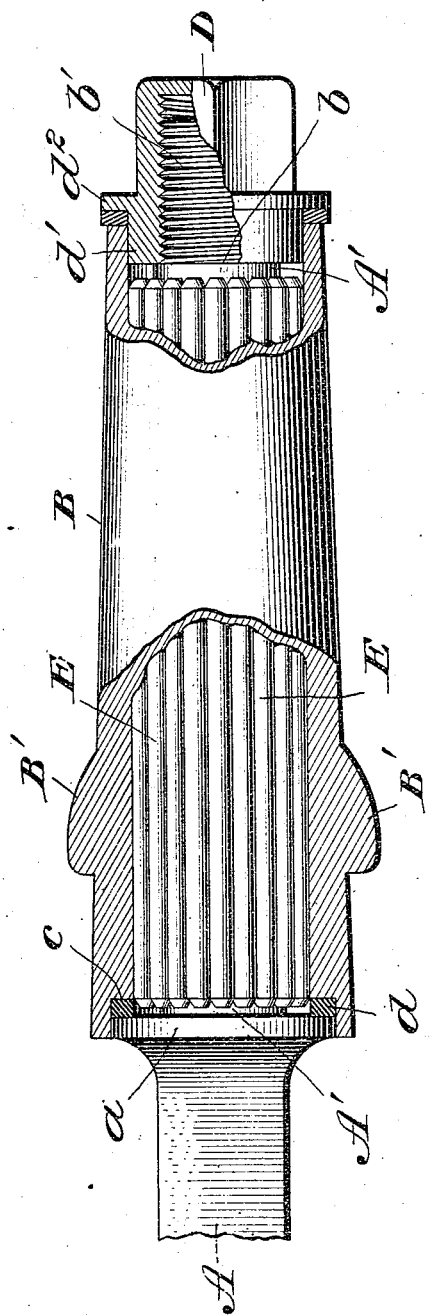

UNITED STATES PATENT OFFICE.

JOHN R. RICHARDSON, OF MADERA, CALIFORNIA.

ROLLER-BEARING FOR AXLES.

SPECIFICATION forming part of Letters Patent No. 648,795, dated May 1, 1900.

Application filed January 20, 1900. Serial No. 2,138. (No model.)

*To all whom it may concern:*

Be it known that I, JOHN R. RICHARDSON, a citizen of the United States, residing at Madera, in the county of Madera and State of California, have invented new and useful Improvements in Roller-Bearings for Axles, of which the following is a specification.

This invention relates to certain new and useful improvements in roller-bearing for axles of vehicles, the object being to provide a simple and effective roller bearing, by means of which the friction and wear of the parts will be greatly reduced.

The invention consists in the construction and combination of the parts, in which combination is included an axle having formed thereon a collar from which projects a cylindrical spindle, the end of the same being reduced and threaded to receive a nut, an axle-box the interior of which is cylindrical and of a greater diameter interiorly than the diameter of the spindle and also of a greater length than said spindle, the axle-box having one end bored out to receive the collar and a washer which is held thereby in the recess, a circular series of rollers which are of less length than the cylindrical portion of the spindle, which rollers have reduced or truncated ends, together with a nut which has an annular portion for engagement with the shoulder of the spindle, and an exterior flange which retains in place a washer, the washer engaging with the outer end of the axle-box, as will be hereinafter set forth.

I have illustrated my invention by a side view, which is partially broken away in order to show the proportion and configuration of the parts.

The axle A has formed integral therewith a collar $a$, having an annular periphery and a straight face or shoulder, from which the spindle A' projects, said spindle being of the same diameter from the collar $a$ to a shoulder $b$, beyond which the spindle is reduced and provided with threads $b'$, with which the axle-nut engages.

The axle-box B has a cylindrical interior of greater diameter than the spindle, and the length of the cylindrical portion of the axle-box from its shoulder $c$ to its outer end exceeds in length the length of the spindle, measuring from the inner face of the collar $a$ to the shoulder $b$. The axle-box on its outside tapers longitudinally and is provided with lugs or projections B', which hold the same from turning when driven into a hub. The size and shape of the exterior of the axle-box are the same as those in general use, which permits the invention to be readily applied to the hubs of vehicles of ordinary construction. The inner or thicker end of the axle-box is cut away or reamed out to reduce its thickness, permitting the axle-box to extend over the collar $a$, and provides between the collar of the spindle and the shoulder of the axle-box a space which receives a washer $d$, which washer and the overlying portion of the axle-box will effectively prevent dust entering the bearing and will also prevent the exit of the lubricant.

The nut D is of special construction, having a thread which extends the full depth of its recess, and the inner end of the nut abuts against the shoulder $b$ of the spindle, while its annular portion $d'$ is slightly less than the interior diameter of the axle-box, and its exterior or annular flange $d^2$ retains in place a washer which overlies the end of the axle-box.

The cylindrical space between the spindle and axle-box is occupied by a series of anti-friction-rollers E, which rollers have their ends truncated and are of less length than the cylindrical portion of the spindle. This admits of longitudinal expansion of the rollers should the same become heated in use and obviates binding or contact of said rollers with the collar of the spindle or the inner face of the nut.

By truncating the ends of the rollers they may be readily inserted between the spindle and axle-box, and should they contact with the nut at one end or the washer or collar at the other end such contact will not impair the efficiency of the device. For instance, contact with the washer will only be with one edge of the same and contact with the annular portion of the nut will be centrally upon its inner face between the box and spindle. This point of contact obviates any tendency to expand the nut so that it will jam in the box, and an expansion of the ends of the rolls will not prevent the removal of the same, which would be the case if they were cut off at right angles or extended the full length of the spindle.

By having the rollers shorter than the spindle in the event of one or more of said rollers breaking the parts will merely separate without disorganizing the series. It will also be noted that the space between the rollers and the collar and nut serves to hold lubricant.

What I claim as new, and desire to secure by Letters Patent, is—

1. In a roller-axle bearing, the combination with a cylindrical spindle having at one end a collar, the other end being provided with a threaded portion of less diameter than the spindle, an axle-box which is of greater length than the length of the cylindrical portion of the spindle, said box being cut out to provide a portion which receives the collar of the spindle, a nut having an exterior flange $d^2$ and an annular portion $d'$ which engages the spindle and the interior of the axle-box, washers one interposed between the axle-box and the collar of the spindle, and the other between the flange of the nut and the end of the axle-box, and a circular series of rollers which are of less length than the spindle, the rollers having truncated ends, substantially as shown and for the purpose set forth.

2. In a roller-axle bearing, the combination of a spindle having adjacent to one end a collar, an axle-box having a cylindrical interior and tapered exterior, lugs formed upon the outer side of the axle-box, the inner end of the axle-box being cut away to provide a recess of greater depth than the width of the collar on the spindle, a nut threaded for engagement with the outer end of the spindle and provided with a portion $d'$ which enters the axle-box and a flange $d^2$ which overlies the outer end of the same; together with a circular series of rolls each roll having its end reduced, said rolls being of less length than the length of the cylindrical portion of the spindle, substantially as shown and for the purpose set forth.

3. The combination with an axle having a collar $a$, a cylindrical spindle $A'$, shoulder $b$, and threaded end beyond the shoulder, an axle-box recessed to receive the collar $a$ of the spindle, the length of the unbroken cylindrical portion of the axle-box being more than the unbroken cylindrical portion of the spindle, of a nut having a flange $d^2$ and a portion which enters the end of the axle-box and engages shoulder $b$ on the spindle, washers between the collar of the axle and the axle-box and between the outer end of the axle-box and the flange $d^2$ of the nut; together with cylindrical rolls the lengths of which are materially less than the unbroken bearing-surface of the spindle, substantially as shown.

In testimony whereof I have hereunto set my hand in presence of two subscribing witnesses.

JOHN R. RICHARDSON.

Witnesses:
ROBERT R. FOWLER,
BENJAMIN W. CHILD.